Oct. 27, 1931.    A. M. ROSSMAN    1,828,947
DRIVE
Filed April 23, 1929    6 Sheets-Sheet 1
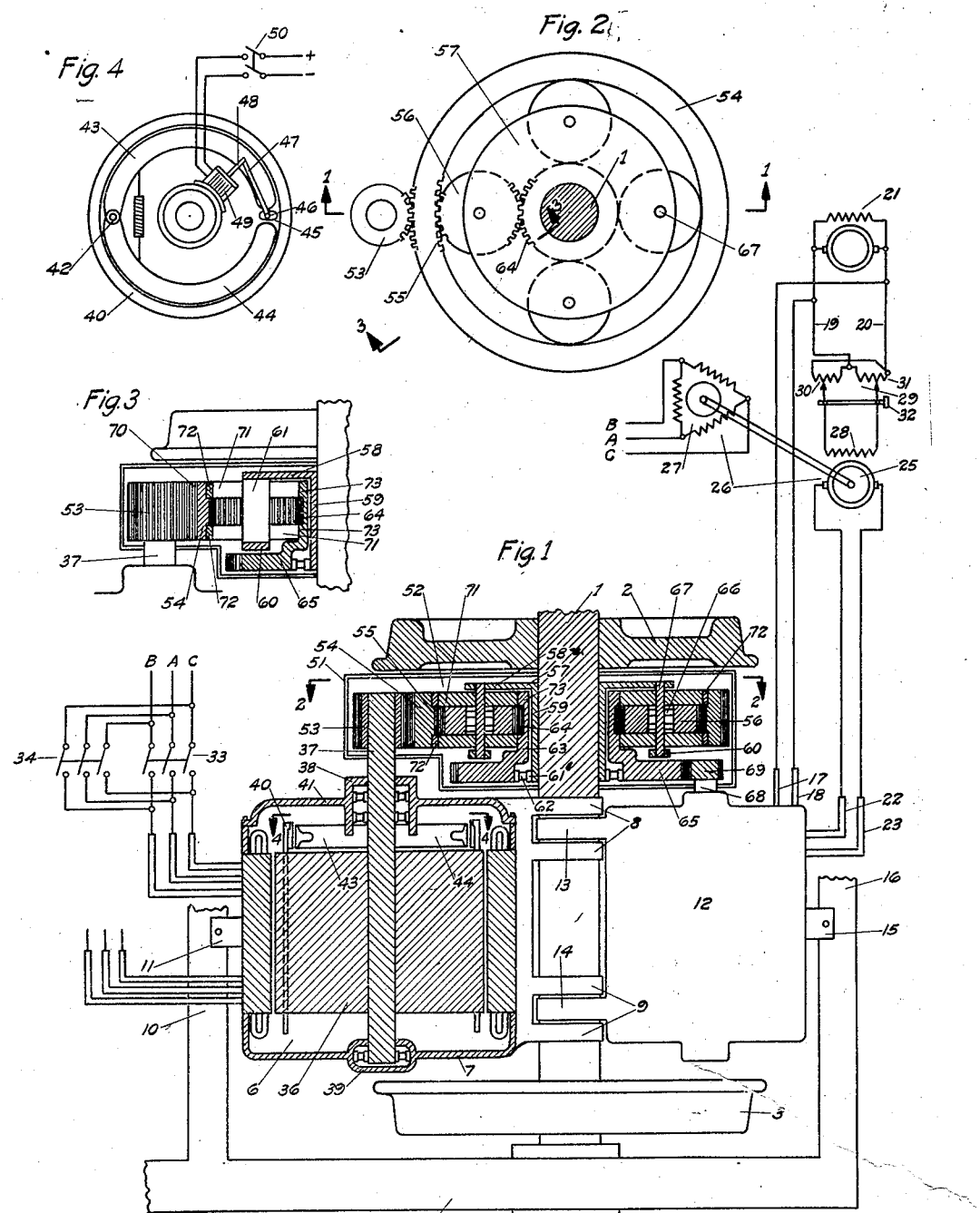
Inventor
Allen M. Rossman
By Brown, Jackson, Boettcher & Dienner
Attys.

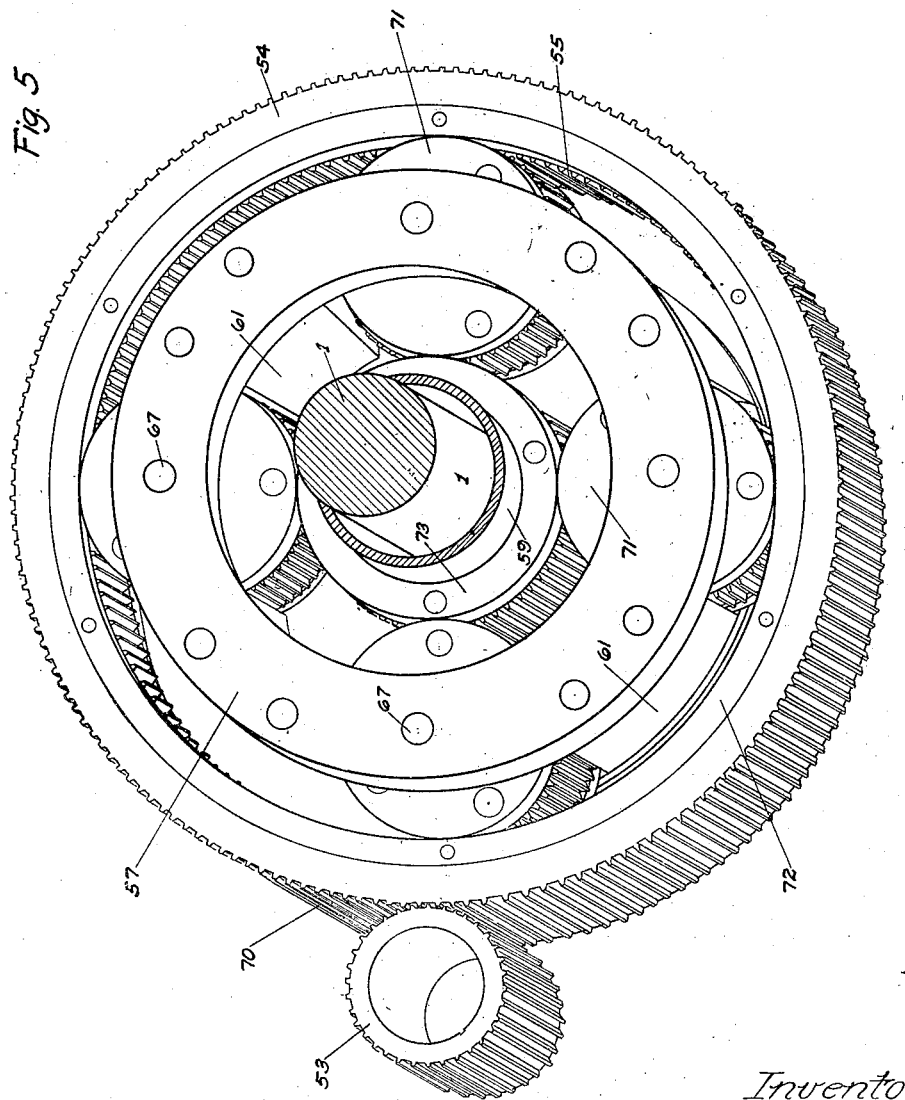

Oct. 27, 1931.  A. M. ROSSMAN  1,828,947
DRIVE
Filed April 23, 1929   6 Sheets-Sheet 3

Inventor
Allen M. Rossman
By Brown, Jackson, Boettcher & Dienner
Attys.

Oct. 27, 1931.  A. M. ROSSMAN  1,828,947

DRIVE

Filed April 23, 1929    6 Sheets-Sheet 4

Inventor
Allen M. Rossman
By Brown, Jackson, Boettcher & Dienner
Attys.

Oct. 27, 1931.  A. M. ROSSMAN  1,828,947

DRIVE

Filed April 23, 1929  6 Sheets-Sheet 5

Inventor
Allen M. Rossman
By Brown, Jackson, Boettcher & Dienner
Attys.

Oct. 27, 1931.  A. M. ROSSMAN  1,828,947
DRIVE
Filed April 23, 1929   6 Sheets-Sheet 6
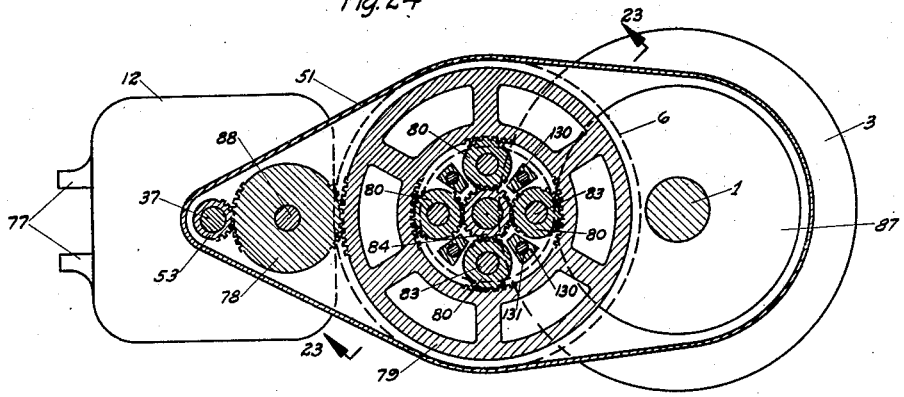
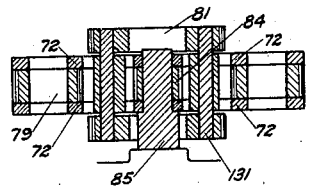
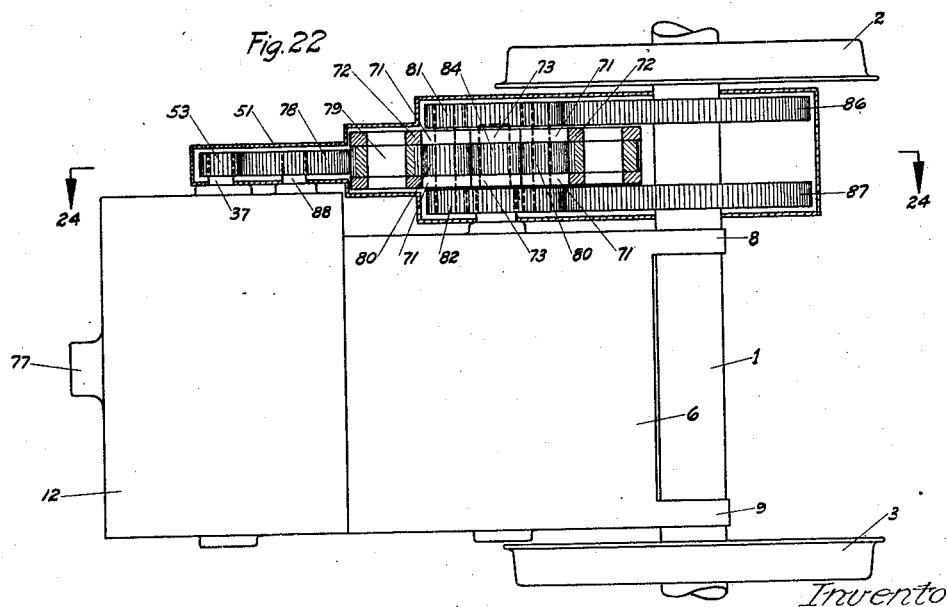

Patented Oct. 27, 1931

1,828,947

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

DRIVE

Application filed April 23, 1929. Serial No. 357,540.

My invention relates to drives for motor vehicles and the like, and includes a novel form of transmission.

In the system of railway electrification disclosed in my copending application, Serial No. 365,832 filed May 25, 1929, commercial alternating current is employed for supplying the driving power to the motor vehicle. The driving axle of the motor car is connected to two driving motors, one of which is an alternating current motor and the other is a direct current motor. By suitable electrical control of these motors the axle may be driven by either of the motors or by both motors. Likewise, either of the motors may be braked or otherwise held stationary while the other is driving. Either or both motors may be driven in reverse direction. By the combination of the permissible actions of these two motors a wide range of operation of the axle is secured. Obviously, instead of an axle any driven element corresponding thereto is comprehended within the broad scope of my invention.

While the specific device herein shown relates to electric railway work, it is to be understood that the invention is not limited to any particular work.

The means for connecting these motors to the driven element in the preferred form of axle comprises a differential transmission employing gears. The form of the transmission may be widely varied within the broad scope of the invention but in the preferred form it is a planetary transmission adapted to be disposed in the limited space available in the truck of an electric track vehicle.

The transmission of my invention provides a greatly reduced axial length and permits convenient coupling to the shafts of the driving motors which may be of substantially standard or conventional design.

In the preferred embodiment the gears have complimentary rolling surfaces, these surfaces lying on the pitch circles of the gears and serving to take the radial load in lieu of more conventional bearings. In other words, the gear members have formed therewith bearing surfaces for rolling engagement and hence for heavy duty and for restricted space such as is required for the present situation, my transmission is of great advantage.

Now in order to acquaint those skilled in the art with the manner of constructing and operating a device embodying my invention, I shall describe in connection with the accompanying drawings one embodiment of the same.

In the drawings:—

Figure 1 is a plan view with parts in section on the line 1—1 of Figure 2 of a part of a truck of a locomotive employing two driving motors and one form of the transmission of my invention;

Figure 2 is an end elevation of the transmission as viewed on the line 2—2 of Figure 1;

Figure 3 is a fragmentary sectional view taken on the line 3—3 of Figure 2;

Figure 4 is an end view of the brake mechanism taken on the line 4—4 of Figure 1;

Figure 5 is an isometric view of one form of the differential transmission of my invention;

Figure 7:
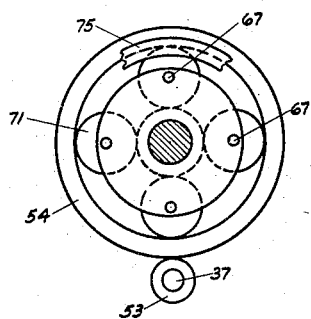
Figure 7 is an end view of the transmission taken on the line 7—7 of Figure 6.

Figures 18 to 21, inclusive, are side views of trucks showing different embodiments of the invention and showing various disposals of the motors in the trucks of an electric traction vehicle;

Figure 22 is a plan view, partly in section, of a preferred embodiment of my invention;

Fig. 23 is a section through the differential transmission taken on the line 23—23 of Figure 24; and Figure 24 is a vertical cross section taken on the line 24—24 of Figure 22.

In Figure 1 I have shown the axle 1 bearing the flanged driving wheels 2 and 3 adapted to run on tracks such as standard railroad tracks. The axle has journal portions at the ends turning in suitable bearings in journal boxes such as shown at 4 at the bottom of Figure 1. These journal boxes are mounted upon a truck frame member such as 5, as will be readily understood by those skilled in the art. The wheels 2 and 3 are fixed on the axle 1. An alternating current motor 6 having a stator frame 7 provided with pairs of ears 8 and 9 is mounted partly on the axle 1 and partly on a cross frame member 10 as by means of the nose 11 and a suitable spring connection between said nose 11 and the frame member 10.

The ears 8 and 9 are bored out to form bearings upon the axle 1 in the well known manner. A direct current motor 12 likewise has the ears 13 and 14 lying between the pairs of ears 8 and 9 and similarly bored out and journaled upon the axle 1. The steel frame of the direct current motor 12 is connected by an ear or lug 15 to the cross frame member 16 of the truck frame 5 through a suitable spring connection as is well known to those skilled in the art.

The motors 6 and 12 are disposed horizontally upon the opposite sides of the axle 1. The direct current motor 12 has field windings which are connected to taps 17 and 18 which in turn are connected to the busses 19 and 20 of an exciter 21 to give a constant excitation of the field connected to the taps 17 and 18.

The armature of the direct current motor 12 is connected to the leads 22 and 23 and these leads in turn are connected in series with the armature 25 of a motor generator set 26 having the A.C. motor 27 connected to the same source of current supply as the A.C. motor 6. The field 28 of the generator 25 is controlled by a control rheostat 29 which governs the polarity and voltage impressed upon the field winding at 28 under the control of the driver of the vehicle. This rheostat has the resistances 30 and 31 bridged across the exciter busses 19 and 20 with suitable contact under the control of an operating member 32 to collect the desired polarity and voltage to be impressed upon the field 28 of the generator 25.

It can be seen that by moving the control member 32 to one extreme or the other the field magnetization of the direct current generator of the motor generator set 26 can be controlled to govern the current flow in the leads 22 and 23 to the armature of the direct current motor 12.

The A.C. motor 6 is preferably of three phase as is the motor 27, although both of these motors may be operated on a single phase current.

The stator windings of the motor 6 are controlled by switches 33 and 34 for operating the motor in forward or reverse direction.

The rotor 36 is mounted upon the shaft 37, this shaft 37 having suitable bearings in bosses 38 and 39 in the end plates of the stator frame.

The rotor 36 has extending bars to which a brake drum 40 (see Figures 1 and 4) is connected. This brake drum may be formed as a part of the end ring of the squirrel cage winding of the rotor 36. The end plates 41 support through a stud 42 (see Figure 4) the hinged end of two brake arms or shoes 43 and 44. The free ends of the shoes 43 and 44 cooperate with a cam member 45 which is pivoted upon a pin 46 mounted upon the inside of the cover member 41. Said cam 45 has an arm 47 connected to the movable plunger 48 of a solenoid member 49 which solenoid member 49 is secured to the end plate preferably upon the inner side thereof and connected to the hub 38.

This solenoid 49 is adapted to be controlled by a suitable control switch 50 which turns the brake arm 47 in a direction to apply the shoes 43 and 44 to the drum 40. The purpose of these brake shoes is to hold the rotor 36 against motion so that the direct current motor 12 may drive the axle 1, as will be described presently.

The shaft 37 of the AC motor 6 extends through the side wall of a gear case or housing 51 which encloses the differential transmission 52. The shaft 37 bears at its inner end a driving pinion 53 and this pinion meshes with a spur ring gear 54, which ring gear is one of the three elements of the differential transmission 52. The gear ring 54 has internal teeth, as indicated at 55, which teeth are adapted to mesh with the teeth of the planet pinions 56. These planet pinions, which are shown as four in number although three may be employed, or any greater number may be employed satisfactorily, are mounted in a cage member 57 which cage comprises a flange 58 formed on the outer end of a sleeve 59 and a ring 60 connected to said flange 58 through spacer blocks or fillers 61 (see Figures 3 and 5). A sleeve member 59 fits closely on the axle 1 and is keyed thereto or otherwise nonrotatably fastened on said axle 1.

The inner end of the sleeve 59 supports a race member 61' of a bearing 62 between the sleeve 59 and the member 63 which member 63 comprises a sun gear 64 and a spur gear member 65.

The planet gears 56 are mounted through roller bearings 66 upon pins or spindles 67 which lie between the flange 58 and the ring 60.

A shaft 68 of the direct current motor 12 has a pinion 69 which meshes with the spur gear 65 so that the direct current motor drives the sun gear 64.

The orbit gear ring 54 has external spur teeth which mesh with the alternating current motor pinion 53 so that the alternating current motor 6 drives the orbit gear.

The planet gears or pinions 56 have rollers or cheek pieces 71, 71 of the same diameter as the pitch circle of the gear teeth and these rollers, or cheek pieces 71 contact with corresponding cylindrical parts on the orbit gear and on the planet gear, respectively. The orbit gear ring has a pair of bearing rings 72, 72 mounted on opposite sides of the gear teeth 55 for rolling contact with the rollers 71 of the planet gear. Likewise the sun gear 64 has bearing portions 73, 73 of the same diameter as the pitch circle of the sun gear 64 cooperating with the rollers 71. In this manner the transmission or differential gear is self-supporting. The radial load of the orbit gear is taken through the rolling surfaces on to the sleeve 63 which bears the sun gear, and the sun gear has its spur gear 65 mounted directly upon the bearing 62 so that the thrust of the direct current motor pinion 69 is carried by said bearing 62.

The cage and spindles 67 hold the planet pinions in alignment and thereby sustain the thrust of the induction motor pinion 53.

If desired, a bearing may be placed between the outer end of the sleeve 63 and the sleeve 59, that is, opposite the bearing 62.

By employing the rolling cylindrical members lying upon the pitch circles of the cooperating gears very large loads may be carried.

In the operation of the device herein shown, the vehicle may be started by applying the brake shoes 44 to the brake drum 40 for the alternating current motor 6 so as to hold the orbit gear stationary and then shifting the controller 29 to start the direct current motor 12, say in the forward direction. This drives the spur gear 65 and the sun pinion 64 causing the cage 57 to be rotated at a reduced speed with respect to the speed of the sun gear 64. In other words, the motor 12 works through a mechanical advantage, that is a gear reduction upon the axle 1, to start the load. After the load has been moved to the limit of speed which the motor 12 can drive it alone, the brake is then thrown off by opening the switch 50 (see Figure 4) and the controller 29 is operated to change the excitation of the field 28 of generator 25 to reverse the motor 12 and cause the motor 12 to speed up the rotor 36 of the alternating current motor 6 to substantially its rated speed whereupon the switch 33 is closed to apply power to the motor 6.

The controller 29 is then operated to load the motor 12 as a generator to cause it to force current to flow back through the motor 25 and cause regeneration of power through the alternating current motor 27. The motor 12 may gradually be slowed down to zero, whereupon the drive of the motor 6 is transmitted wholly to the axle 1 through the transmission 52. Then the controller 29 is further shifter to cause the motor 12 to apply power through the transmission to the axle 1 adding its power through the differential gear to that of the motor 6, all applied to the shaft 1 to cause a higher speed of the shaft 1 up to the rated speed of the motor 12.

Here again the speed may be raised by changing the windings of the motor 6 which may be a two speed motor and accelerating it up to its higher speed rating, which is substantially double its low speed rating in the preferred form, by backward operation of the motor 12 and then the motor 6 may again be energized for its higher speed range. The motor 12 is then gradually slowed down to a standstill to further accelerate the axle 1 and then is supplied with current to cause it to move in the forward direction to add its speed through the transmission to that of the axle 1. Thus with a two speed motor 6 and a reversible direct current motor 12 five successive connected speed ranges may be secured. For reverse drive, that is for driving the motor car in the opposite direction the switch 33 is opened and the switch 34 closed so as to secure reversal between two of the phases.

While I have described three phase operation for the alternating current element, single phase operation is equally possible. The motor 12 may be of much smaller rating than the motor 6, for example, only one-fifth, but because of its slower speed through a part of the range of operation it requires more copper and iron for its rated power than does the motor 6. The combination is peculiarly effective for railway operation on alternating current. Upon descending a curve or decelerating regeneration is accomplished in two ways, first, through the motor 6, and next, through the motor 12. Due to the differential drive of the axle 1 by the two motors and vice versa due to the differential drive from the axle 1 to both motors, each motor will sustain substantially the same torque varied, however, by the mechanical advantage which the two have, but the tendency is to load them in proportion to their mechanical advantage. However, by controlling the speed of the motor 12 regeneration through the motor 6 may be caused even at a relatively low speed to the axle.

The control of the AC motor and of the DC motor may be placed under a single controlling member in the hands of the driver.

In Figures 6 to 17, inclusive, I have shown different embodiments of the transmission of my invention as applied to driving the axle of a track motor vehicle.

Figure 6:
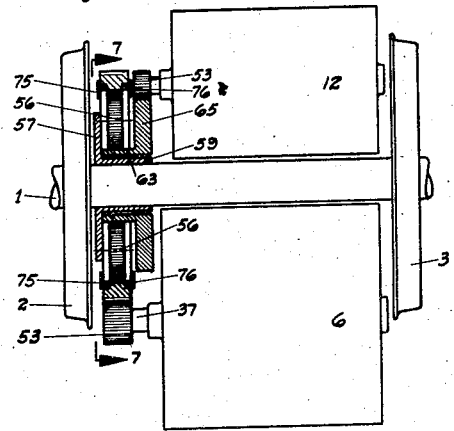
Figure 6 is a plan view of a transmission of the type shown in Figures 1 to 5, shown particularly for comparison with other embodiments of Figures 8 to 16, inclusive.

The embodiments of Figures 6, 8, 10, 12, 14 and 16 are drawn to substantially the same scale for comparison of the various embodiments therein shown. In Figures 6 and 7, it will be observed that I have shown, in addition to the construction shown in Figures 1 to 5, inclusive, the use of a pair of cheek plates or rings 75 and 76 which may be secured upon opposite sides of the orbit gear 54 and extend radially inwardly overlapping the margin of the rollers 71 and their contained pinions 56. The sleeve 63 which is mechanically connected to the gear 65 is shown as having a plain cylindrical bearing upon the sleeve 59 of the cage 57. The preferred embodiment of the transmission is shown in Figs. 8, 9, 22, 23 and 24.

In the embodiment of Figures 1 and 6 the two motors are shown upon opposite sides of the axle 1.

Figure 8:
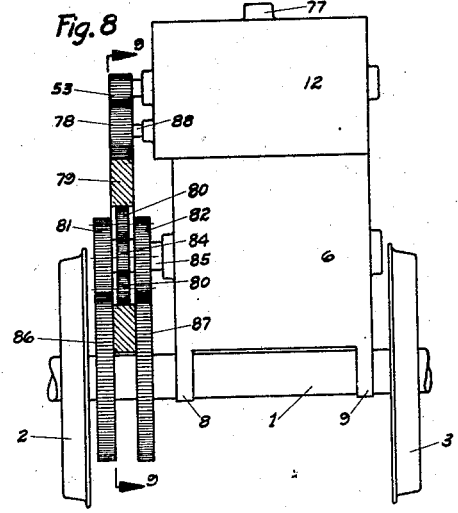
Figure 8 is a plan view of a modified form of transmission.
Figure 20:
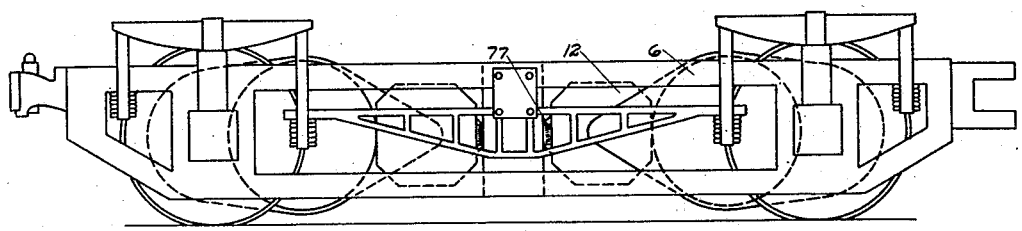
Figure 21:
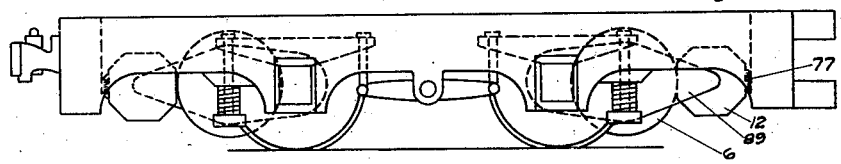

In the embodiment of Figures 8 and 24 the motors are shown upon the same side of the axle 1 and a modified form of transmission is disclosed. In this case the frames of the motors 6 and 12 are connected together and the frame of the motor 6 is slung upon the axle 1 as by means of the lugs or ears 8 and 9, and the frame of the motor 12 has a nose as indicated at 77 connected through suitable buffer springs to the truck frame in which the transmission is mounted. Figures 20 and 21 show different manners of mounting the preferred form of the transmission and the driving axles with their motors in truck frames. In this construction (see Figs. 8, 9, 22, 23 and 24) the motor 12 has a pinion 53 which meshes with idler 78 and the idler 78 in turn meshes with the external teeth on the orbit gear ring 79, said ring having internal teeth meshing with a series of planet idlers or pinions indicated at 80, these idlers being constructed like the idlers 56, that is, having the cheek pieces or rollers 71 with cylindrical surfaces lying on the pitch circles of the teeth of the pinion and rolling on cylindrical surfaces 72 on the interior of the orbit gear ring 79.

Gears 81 and 82 are connected by spacing blocks 130 and bolts or rivets 131, and also by journal pins 83 like the pin 67 shown in Figures 1 and 2. These pins 83 form the journals for the planet pinions 80 and with the blocks 130 and pins 131 connect the two gears 81 and 82 together to form a cage for said planet gears. The planet gears 80 mesh with and revolve about a sun pinion 84 which is secured to the shaft 85 of the alternating current motor 6. The sun pinion 84 has cheek pieces 73 forming rollers cooperating with rollers 71 on the planet gears 80.

The gears 81 and 82 are thus connected and act as the planet gears. If desired, cheek plates or rings such as 75 and 76 shown in Figures 6 and 7 may be employed upon the sides of the ring gear 79 for limiting the endwise play of the planet gears relative to the ring gears.

The gears 81 and 82 which constitute a part of the cage for the planet gears mesh with the bull gears 86 and 87 which are keyed to the driving axle 1. The form of gear shown in Figures 8, 9, 22, 23 and 24 is highly advantageous where it is not necessary to carry the two motors upon opposite sides of the driving shaft or axle 1. Figures 18 to 21 show different manners of disposing the motors in respect to each other while employing the transmission of Figures 8 and 9.

Figure 9:
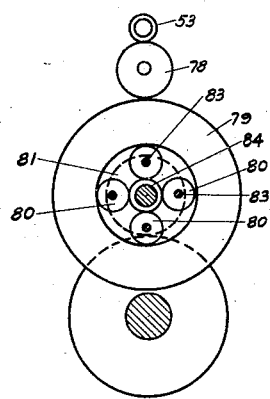
Figure 9 is an end view of the same taken on the line 9—9 of Figure 8.

The idler 78 is mounted upon a stud 88 which is rigidly mounted on the shell or frame of the motor 12 and said motor 12 may be moved to any angular position with respect to that shown in Figure 9 so long as the idler 78 maintains its mesh with the gears upon the outside of the ring gear 79.

Figure 18:
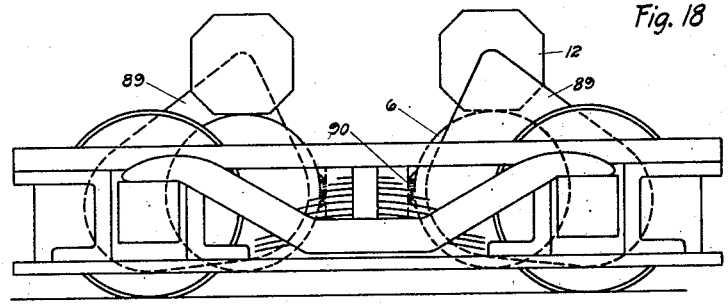

Thus, for example, in Figure 18 the motor 12 may be disposed above the motor 6 with the motor pinion 53 meshing with idler 78 and said idler 78 meshing with the orbit gear 79. A suitable gear case or housing, such as indicated at 89, is employed in each instance to enclose the transmission in a bath of lubricant.

Figure 19:
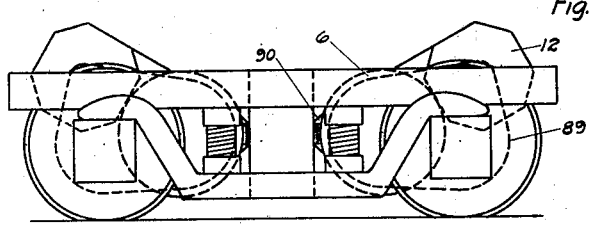

In Figure 19 the motors 12 are carried further in angular position with respect to the motors 6 so that the motors 12 come more nearly over the driving axle but retain the same driving relation as before. In Figure 18 the frame of the motor 6 is provided with a nose 90 connected through bumper springs to the frame of the truck. The same manner of taking up the torque reaction is employed in Figure 19. The construction shown in Figure 18 is more suitable for locomotive construction as it mounts a larger size A.C. motor and the structure shown in Figure 19 is more suitable for multi-unit operation, that is, where driving trucks are employed under load carrying cars. Obviously, the driving wheel diameters should be larger where higher speeds are required.

The construction shown in Figures 20 and 21 is suitable for articulated trucks where greater tractive and load carrying capacities are to be employed.

A further advantage of the construction shown in Figures 8 and 22 is that the direct current motor and its pinion and idler may be removed as a unit without disturbing the alternating current motor and the differential gear.

Likewise, if the differential gear is to be removed this may be done without the necessity for pulling a wheel from the axle 1, as is the case in Figure 6.

By disconnecting the motor 6 from the axle 1, the two motors 6 and 12 may be removed as a unit and readily repaired or serviced or a substitute unit slung into place with a minimum of difficulty. Where different gear ratios are required, as for example for different classes of locomotives, the relation between the diameters of gears 81 and 86 may be varied without change of the other parts of the transmission. The ratio shown in Figures 8 and 22 is substantially that which may be employed for a freight locomotive whereas if the gears 81 and 82 were larger, and the gears 86—87 smaller, a higher speed could be attained as would be desirable for passenger locomotives.

Figure 11:
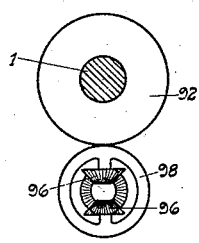
Figure 11 is an end view taken on the line 11—11 of Figure 10.
Figure 10:
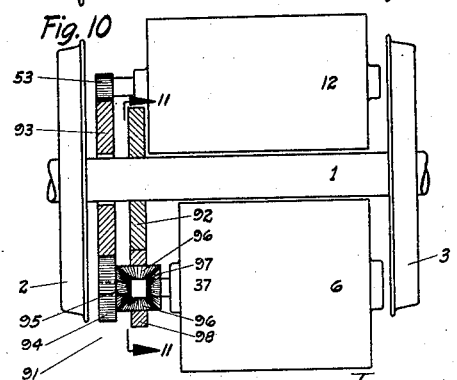
Figure 10 is a plan view of another modification of the transmission.

In Figures 10 and 11 I have shown the motors 6 and 12 disposed upon opposite sides of the axle 1 and connected thereto by ears such as 8, 9, 13 and 14, shown in Figure 1, the same being omitted for the sake of clearness, and a bevel gear differential 91 being employed between the drives of the two motors. In this case the gear 92 is keyed upon the driven axle 1 and the idler gear 93 is loose upon said axle 1 but is driven by the direct current motor pinion 53.

The idler 93 drives the gear 94 which is journaled upon the end of the motor shaft 37 and said gear 94, which is a spur gear, has connected thereto the bevel pinion 95 which meshes with a nest of bevels including the idlers 96, 96 and the bevel driving pinion 97 which is keyed to the alternating current motor shaft 37. The idlers 96, 96 are mounted on studs or pins integral with a spur gear 98 which in turn meshes with the bull gear 92 keyed on the axle 1.

The drive of the direct current motor 12 is thus transmitted to one bevel gear 95 and the drive of the alternating current motor 96 is transmitted through the other bevel gear 97 and these two, meshing with the idlers 96, 96, provide the differential relation which it is the object of the present invention to secure.

Figure 13:
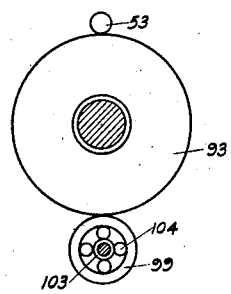
Figure 13 is an end view of the transmission taken on the line 13—13 of Figure 12.
Figure 12:
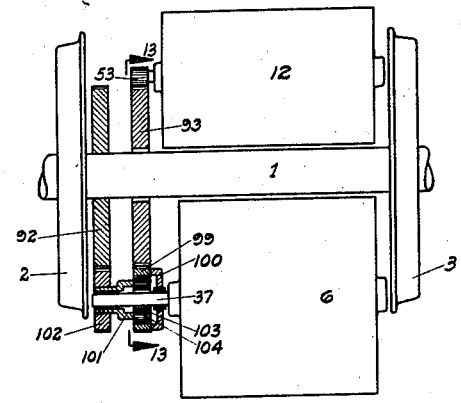
Figure 12 is a plan view of a further modification.

Referring now to Figures 12 and 13, a similar arrangement is shown herein except that instead of a bevel gear differential a planetary differential is employed as between the two motors. The motors 6 and 12 are mounted upon opposite sides of the axle 1, the direct current motor pinion 53 drives through the idler 93 to an orbit gear 99 which is suitably connected to a spider 100 journaled upon the alternating current motor shaft 37. The cage member 101 has a driving gear 102 connected therewith and meshing with the bull gear 92 which is keyed to the axle 1. The alternating current motor shaft 37 has a sun pinion 103 which meshes with the planet gears 104 carried by the cage 101. In this manner the differential gear which is a planetary gear is mounted upon the shaft of the alternating current motor 37 to provide the differential relation between the axle 1 and the motors 6 and 12. One of the features to be considered in arrangements of this character is the securing of the desired gear ratio between the direct current motor and the load.

It is necessary in order to get the proper torque relation to have a relatively high gear ratio if the motor 12 is to be kept within bounds as to space requirements.

Figure 15:
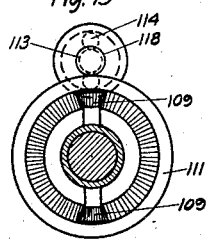
Figure 15 is an end view taken on the line 15—15 of Figure 14.
Figure 14:
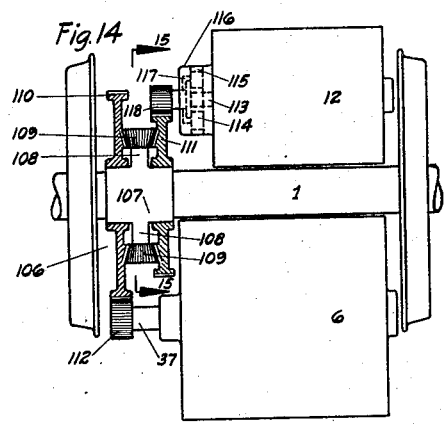
Figure 14 is a plan view of another modification of the transmission.

In Figures 14 and 15 I have shown a differential gear 106 in which the axle 1 has a cage member 107 bearing studs such as 108 upon which bevel pinions or idlers 109 are mounted. These idlers in turn are in mesh with bevel gears carried upon the sides of the spur gears 110 and 111, respectively.

The driving pinion 112 of the alternating current motor shaft 37 meshes with the spur gear 110. The shaft of the direct current motor 12 bears a driving pinion 113 which meshes with a series of planet gears 114, these in turn meshing with an orbit gear 115, carried within the housing 116 on the end of the shell of the motor 12.

The orbit gears 114 are connected to a cage 117 which in turn is connected to the driving pinion 118, this driving pinion in turn meshing with the spur gear 111.

Figure 17:
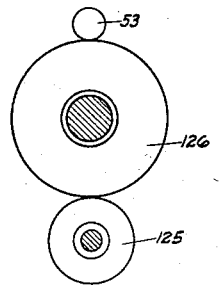
Figure 17 is an end view taken on the line 17—17 of Figure 16.
Figure 16:
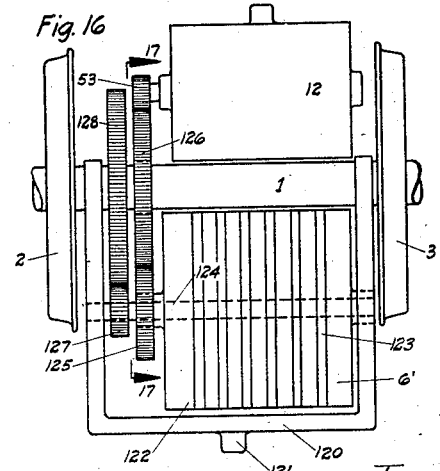
Figure 16 is a plan view of a modification of the transmission.

In Figures 16 and 17 I have shown a modified form in which both of the elements of the alternating current motor 6' are rotatable within the frame 120 which is slung upon the axle member 1 and supported on its nose 121 from the truck frame.

The outer part which would normally correspond to the stator of the alternating current motor 6' is indicated at 122 and it is provided with suitable collector rings 123 by which connection is made with the winding. The rotatable element 122 is journaled upon the shaft 124 which is also rotatably mounted in the frame 120. The outer rotating member 122 is connected to the driving gear 125 which meshes with the idler gear 126 journaled upon the axle 1. The direct current motor has its driving pinion 53 likewise meshing with the idler 126 so that these two parts, namely the armature shaft of the direct current motor and the outer rotatable element of the alternating current motor are geared together. The shaft 124 to which the squirrel cage member of the motor 6' is connected has a pinion 127 keyed thereto and the pinion 127 meshes with the bull gear 128 which is keyed to the axle 1.

In this case the differential effect is secured between the two independently rotatable elements of the alternating current member 6. Obviously, the same result could be secured by having the two elements of the direct current motor separately rotatable although this would involve the transmission of current to each of the rotatable members which is avoided in the case of the alternating current member which has only one wound member connected externally. Two sets of collector rings for the motor 6' are employed for the high speed and low speed, as previously explained in connection with Figure 1.

The foregoing embodiments are merely illustrative of the different modes in which my invention may be embodied in driving of a shaft such as the axle of a truck for railroad motor cars, and the like.

The present application is chiefly concerned with the mechanical arrangement of the two motors and their connection to the axle with, broadly, the means for actuating the motors as to forward, reverse and zero speed conditions. The controller and connections therefor are explained more in detail in my copending application.

I do not intend to be limited to the details shown and described as the same may be varied without departing from the spirit and scope of my invention.

I claim:

1. In combination an axle bearing railroad track engaging wheels, a pair of electric motors having driving shafts parallel to the axle and a three element differential gear lying at the same side of both motors and connecting said shafts and said axle said motors drawing power from the same source of electric supply.

2. In combination an axle, a pair of electric motors having driving shafts parallel to the axle and having frames connected to the axle, and a three element differential gear connecting said axle and said shafts said motors drawing power from the same source of electric supply.

3. In combination an axle, a pair of electric motors having driving shafts parallel to the axle, a three element differential gear connecting said axle and said shafts and means to drive said motors one at a time said motors drawing power from the same source of electric supply.

4. In combination an axle, a pair of electric motors having driving shafts parallel to the axle and having their frames slung upon the axle, a three element differential gear connecting said shafts to the axle and means for holding one of said motor shafts stationary said motors drawing power from the same source of electric supply.

5. In combination an axle, a pair of electric motors having driving shafts parallel to the axle and having their frames slung upon the axle, a three element differential gear connecting said shafts to the axle, means for selectively applying power to either of the motors or for holding either of said motors stationary selectively said motors drawing power from the same source of electric supply.

6. In combination an axle, a pair of motors having driving shafts parallel to the axle and having frames mounted in part upon said axle, a three element differential gear connecting said shafts to said axle, a brake for one of the motor shafts, current supplying means for said motors, said current supplying means including reversible connections for one of said motors.

7. In combination an axle, a pair of electric motors for driving the axle, said motors having driving shafts parallel to the axle and having their frames connected to the axle, one of said motors being an alternating current motor and the other motor being a direct current motor, and means for holding the shaft of the alternating current motor stationary.

8. In combination an axle, an alternating current motor and a direct current motor having their shafts parallel to the axle and having their frames connected to the axle, a three element differential including driving members geared to the motor shafts and a driven member connected to the axle and a common source of electricity for both motors.

9. In combination an axle, a pair of electric motors having their frames slung upon the axle and having shafts parallel to the axle, a planetary transmission having a sun gear connected to one of the motor shafts and having an orbit gear connected to the other of said shafts and having planet pinions connected to the axle.

10. In combination an axle, an alternating current motor and a direct current motor both mounted in fixed relation to the axle and having shafts parallel to the axle, a planetary transmission connecting the shafts to the axle, said planetary transmission including an orbit gear connected to the alternating current motor shaft, a sun gear connected to the direct current motor shaft, and a cage having planet idlers between the sun and orbit gears, said cage being connected to the axle.

11. In a device of the class described, an alternating current motor having a housing, a stator connected to the housing, a rotor rotatively mounted within the housing, a brake shoe mounted within the housing and a brake drum carried by the rotor and adapted to be engaged by the brake shoe within the housing.

12. In a device of the class described, an alternating current motor having a housing, a stator connected to the housing, a rotor rotatively mounted within the housing, a brake shoe mounted within the housing and a brake drum carried by the rotor and adapted to be engaged by the brake shoe within the housing, and electromagnetic means for applying the brake shoe to the brake drum.

13. In combination an axle, wheels on said axle, a pair of motors having frames slung on said axle, a truck frame supported on said axle, connections between said motor frames and said truck frame, said motors having shafts spaced at different radial distances from said axle and being substantially parallel to the axle, and a differential gear connecting said motor shafts and said axle.

14. In combination an axle, wheels on said axle, a pair of motors having frames slung on said axle, a truck frame supported on said axle, connections between said motor frames and said truck frame, said motors having shafts spaced at different radial distances from said axle and being substantially parallel to the axle, and a differential gear connecting said motor shafts and said axle, said differential gear comprising an orbit gear driven by one of said motors, a sun gear driven by the other of said motors, and a cage having a planet pinion, said cage being connected to the axle.

15. In combination an axle, wheels for said axle, an alternating current motor and a direct current motor having field frames slung on said axle, said motors having shafts substantially parallel to said axle and a three element differential gear connecting said axle and said motors.

16. In combination an axle, a squirrel cage motor connected to the axle and having a shaft substantially parallel to the axle, a reversible direct current motor of less horse power rating than said squirrel cage motor also connected to the axle and having its shaft parallel to the axle, and a planetary differential gear between said shafts and the axle, said gear providing a mechanical advantage for the direct current motor.

17. In combination an axle, an alternating current motor, a direct current motor, said motors having frames supported on said axle and having shafts substantially parallel to the axle, a differential gear connecting said axle and said motor shafts, said differential gear comprising spur gears and pinions on said motor shafts cooperating with said spur gears.

18. In combination a driven shaft, a pair of motors having driving shafts parallel to the driven shaft, gears connecting all of said shafts together, one of said motors having two rotatable elements between which a driving torque is developed and applied to the driven shaft.

19. In combination a driven shaft, a pair of motors having driving shafts parallel to the driven shaft, one of said motors having two rotatable elements between which a torque is developed, gear means connecting one of said rotatable elements to the driven shaft and means connecting the other of said rotatable elements to the driving shaft of the other motor.

20. In combination a driven shaft, a pair of electric motors having shafts parallel to the driven shaft, a sun gear connected to one of said motor shafts, a cage having a gear, planet pinions in the cage meshing with the sun gear, an orbit gear embracing the planet gears and meshing with the same, a pinion on the other motor shaft having driving relation with the orbit gear, and a bull gear mounted on the driven shaft meshing with the gear of the cage.

21. In combination an axle, a pair of motors having shafts parallel to the axle, a sun gear on one of the motor shafts, planet gears meshing with said sun gear, a cage for the planet gears, said cage having cage gears on opposite sides of the planet gears, an orbit gear embracing the planet gears and meshing with the same internally, the other motor shaft having a pinion for driving the orbit gear, and a pair of bull gears on the axle meshing with the cage gears.

22. In combination an axle, a pair of motors having field frames connected together and slung upon the axle, a differential gear having a cage, said cage having gears meshing with the bull gears on the axle, said motors having parallel shafts, a sun gear driven by one of said motor shafts, planet gears mounted in the cage and meshing with the sun gear, an orbit gear embracing said planet gears, said orbit gear lying between the bull gears and means connecting the orbit gear and the other motor shaft in driving relation.

23. In combination, a driven shaft, a pair of motors having stationary frames and having driving shafts disposed parallel to and spaced from the driven shaft, one of said motors being an alternating current motor and the other being a direct current motor, and a three element differential gear having its three elements connected to said three shafts.

24. In combination, a driven shaft, a pair of motors having relatively stationary frames and having driving shafts disposed parallel to and spaced from the driven shaft, one of said motors being a main alternating current motor and the other being an auxiliary direct current motor, and a three element planetary differential gear connecting said shafts in differential relation, said differential gear comprising an orbit gear element, a planetary gear element and a sun gear element, said orbit gear element being driven by the shaft of the direct current motor.

In witness whereof, I hereunto subscribe my name this fifth day of April, 1929.

ALLEN M. ROSSMAN.